Figure 1:
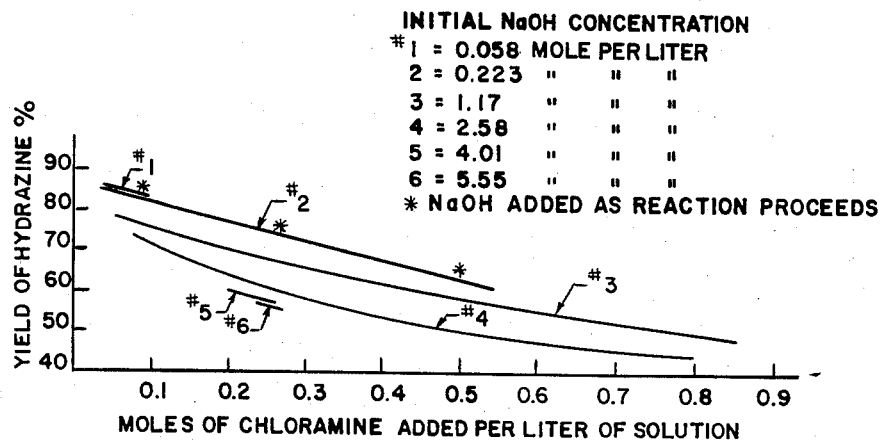

Dec. 9, 1958  H. H. SISLER ET AL  2,863,728
PRODUCTION OF HYDRAZINE
Filed Oct. 17, 1955

R.S. DRAGO
H.H. SISLER  INVENTORS.

BY Kenneth E. Prince
Their attorney

Patented Dec. 9, 1958

2,863,728

PRODUCTION OF HYDRAZINE

Harry H. Sisler, Columbus, Ohio, and Russell S. Drago, Champaign, Ill., assignors to The Ohio State University Research Foundation, Columbus, Ohio Application October 17, 1955, Serial No. 540,864

6 Claims. (Cl. 23—190)

This invention relates to the production of hydrazine. In one specific aspect, it relates to the production of hydrazine from the chloramine-ammonia reaction in aqueous solution.

It is well known in the art that hydrazine can be prepared from the reaction of chloramine and ammonia in aqueous solution. Friedrich Raschig, in U. S. Patent No. 910,858, teaches this reaction according to the following equation:

$$NH_2Cl + NH_3 \rightarrow NH_2NH_2 \cdot HCl$$

Raschig suggests that this reaction be accomplished by treating a sodium hypochlorite solution directly with an excess of ammonia. The formation of chloramine from this mixture is virtually instantaneous. Two subsequent reactions are then known to occur. In one of these, chloramine reacts with ammonia in the presence of hydroxide ions to yield hydrazine. The second of these reactions, which proceeds at a greater rate than the first, is the reaction of hydrazine and chloramine to form ammonium chloride and nitrogen. These reactions are summarized by the following equations:

$$NH_2Cl + NH_3 + NaOH \rightarrow N_2H_4 + NaCl + H_2O$$

$$2NH_2Cl + N_2H_4 \rightarrow 2NH_4Cl + N_2$$

The addition of materials such as glue, gelatin, or albumin, which complex metal ions, to the reaction mixture was found to inhibit the chloraminehydrazine reaction and permit the reaction of chloramine and ammonia to proceed with the formation of satisfactory yields of hydrazine.

The function of the hydroxide ion in the chloramine-ammonia reaction mixture has not been heretofore thoroughly understood. Two distinct mechanisms have recently been proposed as possible paths for the reaction between chloramine and ammonia. One of these is based on the formation of hydrazine hydrochloride and is shown in the following equation:

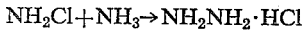

$$NH_2Cl + NH_3 \xrightarrow{} (N_2H_5Cl) \xrightarrow{(OH^-)} N_2H_4 + Cl^- + H_2O$$

The other has as its basis the well-known Hoffman rearrangement in which the chloramide ion, NHCl⁻, is the attacking species:

$$NH_2Cl + OH^- \rightleftharpoons NHCl^- + H_2O$$

$$NHCl^- + B \rightarrow HNB + Cl^-$$

where B=NH₃. The advocates of this latter mechanism have claimed that only in solutions containing fixed base such as sodium hydroxide does chloramine react with ammonia to yield hydrazine, for only in highly basic solutions will the formation of appreciable concentrations of the chloramide ion, NHCl⁻, be possible. The applicants have found, however, that large quantities of sodium hydroxide decrease the yield of hydrazine. This decrease is possibly explained by the decomposition of chloramine as shown by the following equation:

$$3NH_2Cl + 3NaOH \rightarrow 3NaCl + N_2 + NH_3 + 3H_2O$$

In spite of this decomposition reaction, proponents of the mechanism based on the Hoffman rearrangement have advocated producing hydrazine from aqueous ammonia solutions which have been made strongly alkaline by the addition of sodium hydroxide, or similar basic hydroxide prior to the addition of chloramine or the formation of chloramine within the solution.

In a reported process where chlorine diluted with nitrogen is passed into a large excess of ammonia in the presence of glue in a dilute aqueous solution, thereby forming a chloramine-ammonia reaction mixture as an intermediate stage, the yield of hydrazine is only 20 to 4.95 percent.

The present invention offers a substantial improvement over the known prior art by demonstrating an improved yield of hydrazine over the best reported for the Raschig synthesis or similar processes at similar mol ratios of chloramine and ammonia. Furthermore, the method of this invention may be carried out at room temperatures to accomplish these improved results.

It is, therefore, an object of the present invention to obtain improved yields of hydrazine for the chloramine-ammonia reaction in aqueous solution.

Conditions necessary for the improved recovery of hydrazine from a chloramine-ammonia reaction mixture containing an organic, metal-complexing substance will become apparent from the following description, when read in connection with the accompanying drawing in which:

Figure 1 shows the percent yield of hydrazine versus the mols of chloramine added per liter of solution, where the percent yield of hydrazine is compared for various chloramine-ammonia reaction mixtures having different initial sodium hydroxide concentrations. For the more dilute sodium hydroxide initial concentrations, additional caustic was added step-wise as the reaction proceeded to maintain a slight excess of sodium hydroxide over the unreacted chloramine in the solution.

Figure 2:
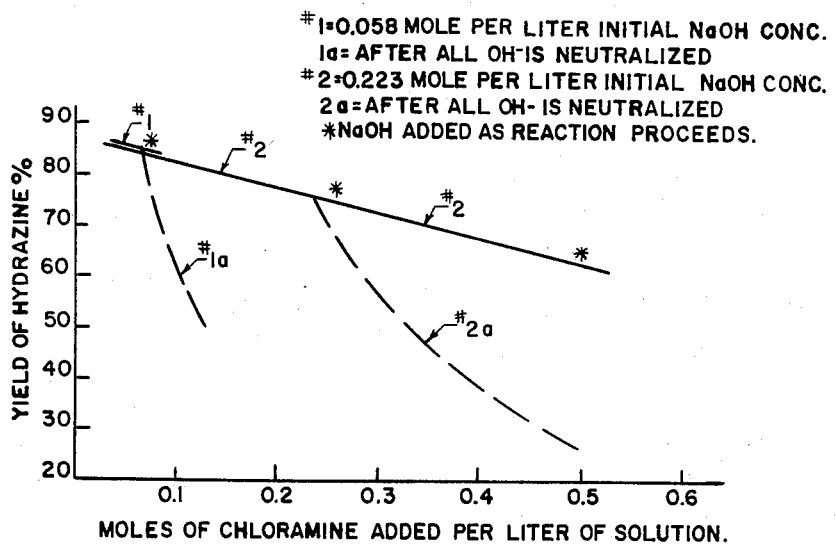

Figure 2 shows the percent hydrazine versus the mols of chloramine added per liter of solution, where a comparison is given between chloramine-ammonia reaction mixtures containing a small amount of sodium hydroxide per liter of solution. In one set of cases, the amount of caustic in solution was allowed to be consumed with no subsequent addition of sodium hydroxide, and in the other, the caustic was added step-wise as the reaction proceeded, each time replacing that amount used up by the reaction.

The effect of the hydroxide ion on the chloramine-ammonia reaction is demonstrated by Figures 1 and 2. The chloramine-ammonia reaction mixtures portrayed by these figures contained gelatin to inhibit the metal ion catalyzed reaction of chloramine and hydrazine.

Figure 1 shows that an increase in concentration of sodium hydroxide has a decidedly deleterious effect on the yield of hydrazine from the chloramine-ammonia reaction. For initial concentrations of sodium hydroxide in the range of 0.058 mol per liter, an 83 to 85 percent yield of hydrazine was obtained when 0.05 of a mol of chloramine was added per liter of solution. Where the initial concentration of sodium hydroxide was increased to 5.55 mols per liter, only 55 percent yield of the hydrazine was obtained where the amount of chloramine added was 0.26 mol per liter of solution.

For a more direct comparison, solutions to which the same quantity of chloramine was added per liter can be examined. A mixture containing 0.223 mol of sodium hydroxide per liter to which 0.25 mol of chloramine were added per liter of solution gave a 75 percent yield of hydrazine. Since the amount of chloramine added per liter of solution was in excess of the initial concentration of sodium hydroxide, a small amount of sodium hydroxide was added incrementally to replace that which was used up during the chloramine-ammonia reaction. The total number of mols of sodium hydroxide, including those added to the solution and those already present should be slightly in excess of total number of mols of chloramine added per liter of solution. A second mixture containing 4.01 mols of sodium hydroxide per liter of solution to which 0.25 mol of chloramine was added per liter of solution gave only a 58 percent yield of hydrazine. No additional caustic was added, since the number of mols of caustic was at all times in excess of the number of mols of chloramine added per liter of solution.

The importance of this "slight excess" is emphasized in Figure 2. Where a small initial amount of caustic was present without subsequent addition to replenish the solution during the reaction, a significant decrease in the yield of hydrazine was observed when the number of mols of chloramine added per liter of solution exceeded the number of mols of caustic present. This decrease can be prevented by the step-wise addition of caustic to the solution to replace that used up by the reaction.

For a chloramine-ammonia reaction mixture having an initial sodium hydroxide concentration of 0.058 mol per liter, a 52 percent yield of hydrazine was obtained when 0.12 mol of chloramine was added per liter of solution. In this instance the caustic was used up during the chloramine-ammonia reaction. When additional caustic was added incrementally to identical chloramine-ammonia reaction mixtures, the hydrazine yield was 82 percent. Where the number of mols of chloramine added was 0.4 mol per liter of solution in a solution having an initial caustic concentration of 0.223 mol per liter, only a 39 percent yield of hydrazine was obtained where the caustic in solution was allowed to be used up by the reaction. However, where an incremental addition of caustic replaced that which was used up a yield of 69 percent of hydrazine was obtained from an identical solution when the same amount of chloramine was added.

Furthermore, it is interesting to note from Figure 2 that the yields of hydrazine obtained in 0.058 molar caustic and in 0.223 molar caustic fall almost on the same curve as long as the number of mols of chloramine added per liter of reacting solution does not exceed the molarity of the sodium hydroxide. This fact casts doubt upon any mechanism involving caustic or hydroxide ion in the hydrazine forming step of the reaction, because, unlike the Hoffman rearrangement, the hydrazine forming reaction does not appear to be effected by the hydroxide ion concentration. The sharp decrease in yield that occurs when all of the caustic is used up is believed to result from the fact that the gelatin-hydroxide complex breaks down at this point and impurities in the reaction mixture catalyze the decomposition reaction.

As is indicated by the following equation:

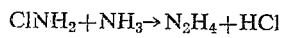

$$ClNH_2 + NH_3 \rightarrow N_2H_4 + HCl$$

the chloramine-ammonia reaction to produce hydrazine results in the liberation of hydrogen chloride. In the absence of stronger base this hydrogen chloride combines immediately with ammonia to produce ammonium chloride. It is known that ammonium ions have a deleterious effect on the yield of hydrazine. In the presence of strong bases such as sodium hydroxide, however, the hydrogen chloride is converted to sodium chloride, thus avoiding the harmful effect of ammonium ion.

We believe that the decrease of the hydrazine yield in the presence of strong alkali is caused by the decomposition of chloramine in the presence of excess caustic. The following table, based on the decreased yield of hydrazine from solutions to which 0.2 mol of chloramine were added per liter, shows the decomposition of chloramine as the concentration of sodium hydroxide is increased.

| Average Concentration of NaOH | 0.027 | 0.123 | 1.07 | 2.35 | 3.91 | 5.45 |
|---|---|---|---|---|---|---|
| Percent of Total NH$_2$Cl Decomposed by Caustic | .0 | 1.3 | 9.1 | 18.2 | 22.1 | 23.4 |

It is therefore obvious that concentrations of sodium hydroxide should be maintained as low as possible, preferably in the range of 0.03 to 0.2 which is suitable for corresponding amounts of chloramine added per liter of solution.

In accordance with the present invention we have found that it is desirable to have only enough caustic present to remove the hydrogen ions produced in the chloramine-ammonia reaction plus a slight amount to stabilize the gelatin complex which militates against the deleterious impurities in the solution.

Accordingly, to a reaction mixture of chloramine and aqueous ammonia containing gelatin, an alkali metal hydroxide can be added incrementally to maintain an amount of hydroxide ion sufficient to neutralize any free acid present with a slight excess to stabilize the gelatin complex. The amount of hydroxide ion present should be in slight but not in great excess of the molar equivalent of chloramine in the reaction mixture. A large excess of hydroxide ion induces the decomposition reaction of chloramine. The reactions may be carried out at room temperature and yields of hydrazine as high as 85 percent are obtained where the number of mols of chloramine added is 0.05 mol per liter of solution. A large excess of ammonia favors the recovery of hydrazine. When the concentration of ammonia in a saturated solution ranges from 60 to 240 mols of ammonia per mol of chloramine added and the amount chloramine added is 0.03 to 0.2 mol per liter of solution, the hydrazine recovery ranges from 74 to 85 percent. This process could be made to operate continuously by the continuous addition of chloramine, ammonia, and an alkali metal hydroxide in the previously referred to proportions to the system and the continuous withdrawal of a stream of the reaction mixture containing hydrazine and a metallic chloride salt.

The present invention will be further illustrated by the following examples:

*Example I*

Aqueous solutions of ammonia, sodium hydroxide, and gelatin were prepared by heating and stirring gelatin suspensions in solutions of different sodium hydroxide concentrations until the gelatin dissolved. Distilled water was added in each case to give a total volume of 70 ml. The solutions were then saturated with ammonia at 21° C. and the total volume determined.

A gaseous mixture of chloramine and ammonia was passed into jointed traps containing the above solutions. The solutions were kept in a temperature range of 21 to 24° C. by a water bath while the chloramine was being added.

To a solution containing an initial concentration of 0.223 mol per liter of sodium hydroxide, 0.12 mol of chloramine were added per liter of solution. The resultant yield of hydrazine was 52 percent. To a similar solution containing an initial concentration of 0.223 mol per liter sodium hydroxide, 0.12 mol per liter of chloramine were added, but concurrently with the addition of the chloramine additional sodium hydroxide was added. By this technique the existence of a large concentration of strong alkali was avoided at any one time during the experiment and yet enough caustic was provided to neutralize all of the acid formed by the reactions of chloramine. The resultant yield of hydrazine was 82 percent.

More concentrated solutions of sodium hydroxide were tested, each time with the addition of 0.12 mol of chloramine per liter of solution. For a solution having an initial concentration of 1.17 mols of sodium hydroxide per liter a 75 percent yield of hydrazine was obtained. In a solution containing an initial concentration of 2.58 mols of sodium hydroxide per liter to which 0.12 mol of chloramine were added per liter the resultant yield of hydrazine was 70 percent.

*Example II*

In a similar method to that illustrated by Example I solutions of ammonia, sodium hydroxide, and gelatin were prepared, and to these solutions, 0.26 mol of chloramine were added per liter of solution. Where the initial concentration of sodium hydroxide in solution was 0.223 mol per liter the resultant yield of hydrazine was 62 percent. To a similar solution containing 0.223 mole per liter of caustic to which additional sodium hydroxide was added to replace that used up during the reaction concurrently with the addition of chloramine, a 73 percent yield of hydrazine was obtained. Where the initial concentration of sodium hydroxide was 1.17 a 67 percent yield of hydrazine was obtained. Where the initial concentration of sodium hydroxide was increased to 2.58 a 60 percent yield of hydrazine was obtained. In a solution containing a 4.01 initial concentration of sodium hydroxide, a yield of only 57 percent of hydrazine was obtained. A concentration of sodium hydroxide of 5.55 mols per liter resulted only in a yield of 55 percent of hydrazine. In all of the aforementioned cases, 0.26 mol of chloramine were added per liter of solution.

We claim:

1. A method of producing hydrazine comprising providing a liquid reaction mixture consisting essentially of an aqueous solution of ammonia, a material selected from the group consisting of glue, gelatin and albumin, and an alkali metal hydroxide, adding simultaneously about 0.03 to 0.2 mol of chloramine per liter of said solution while maintaining therein a large numerical excess of moles of ammonia to moles of chloramine and additional quantities of said metal hydroxide to said reaction mixture sufficient to maintain therein a quantity of said metal hydroxide slightly in excess of the unreacted chloramine in said reaction mixture, separating out and recovering the hydrazine thus formed.

2. A method according to claim 1 wherein the alkali metal hydroxide is sodium hydroxide.

3. A method of producing hydrazine comprising providing a body of an aqueous solution consisting essentially of ammonia, a material selected from the group consisting of glue, gelatin and albumin, and an alkali metal hydroxide, adding continuously about 0.03 to 0.2 mol of chloramine per liter of said solution and additional quantities of ammonia while maintaining therein a large numerical excess of moles of ammonia to moles of chloramine and sufficient alkali metal hydroxide to said solution to maintain therein a quantity of said metal hydroxide slightly in excess of the unreacted chloramine in said solution, continuously withdrawing a stream of the reaction mixture, and recovering hydrazine therefrom.

4. A method of producing hydrazine comprising providing a liquid reaction mixture consisting essentially of an aqueous saturated solution of ammonia, a material selected from the group consisting of glue, gelatin and albumin, and an alkali metal hydroxide, adding simultaneously to said reaction mixture 0.03 to 0.2 mol of chloramine per liter of said solution while maintaining therein a concentration of ammonia in a ratio of 60 to 240 mols of ammonia per mol of chloramine added, and additional quantities of said alkali metal hydroxide sufficient to maintain in said solution a quantity of said alkali metal hydroxide slightly in excess of the unreacted chloramine therein, separating out and recovering the hydrazine thus formed.

5. In a process for producing hydrazine by reacting chloramine and ammonia in aqueous solution in the presence of an alkali metal hydroxide and a material selected from the group consisting of glue, gelatin and albumin, the method of improving the yield of said hydrazine comprising adding simultaneously to an aqueous solution consisting essentially of ammonia, a material selected from the group consisting of glue, gelatin and albumin, and an alkali metal hydroxide, about 0.03 to 0.2 mole of chloramine per liter of said solution while maintaining therein a large numerical excess of moles of ammonia to moles of chloramine and additional quantities of said alkali metal hydroxide to maintain in said solution a quantity of said metal hydroxide slightly in excess of the unreacted chloramine in said solution, thereby stabilizing said organic substance in its inhibitory effect on the metal ion-catalyzed reaction of chloramine and hydrazine, separating out and recovering the hydrazine thus formed.

6. In a process for producing hydrazine wherein chlorine diluted with nitrogen is added to a dilute aqueous solution consisting essentially of ammonia and a material selected from the group consisting of glue, gelatin and albumin, the method of improving the yield of said hydrazine comprising adding step-wise to said dilute aqueous solution chlorine diluted with nitrogen to form therein in situ 0.03 to 0.2 mol of chloramine per liter of solution while maintaining therein a large numerical excess of moles of ammonia to moles of chloramine, adding sufficient quantities of an alkali metal hydroxide to maintain in said solution a quantity of said metal hydroxide slightly in excess of any unreacted chloramine formed by the reaction of chlorine and ammonia in said solution, separating out and recovering the hydrazine thus formed.

References Cited in the file of this patent

UNITED STATES PATENTS

| | | |
|---|---|---|
| 910,858 | Raschig | Jan. 26, 1909 |

FOREIGN PATENTS

| | | |
|---|---|---|
| 22,957 | Great Britain | 1907 |
| 139 | Great Britain | 1908 |

OTHER REFERENCES

"The Chemistry of Hydrazine," by L. F. Audrieth and B. A. Ogg, pp. 28–35, 1951 ed., John Wiley and Sons, Inc., N. Y.

UNITED STATES PATENT OFFICE

CERTIFICATE OF CORRECTION

Patent No. 2,863,728                                           December 9, 1958

Harry H. Sisler et al.

It is hereby certified that error appears in the printed specification of the above numbered patent requiring correction and that the said Letters Patent should read as corrected below.

Column 2, line 13, for "4.95 percent." read -- 49.5 percent. --.

Signed and sealed this 10th day of March 1959.

(SEAL)

Attest:

KARL H. AXLINE

Attesting Officer

ROBERT C. WATSON
Commissioner of Patents